United States Patent
Chan

(10) Patent No.: US 6,177,110 B1
(45) Date of Patent: Jan. 23, 2001

(54) LOLLIPOP WITH EDIBLE STICK

(75) Inventor: Pak Nin Chan, Kowloon (HK)

(73) Assignee: Candy Novelty Works Ltd., Kowloon (HK)

( * ) Notice: Under 35 U.S.C. 154(b), the term of this patent shall be extended for 0 days.

(21) Appl. No.: 09/103,277

(22) Filed: Jun. 23, 1998

(51) Int. Cl.[7] .................................................. A23G 3/00
(52) U.S. Cl. .................................. 426/90; 426/5; 426/96; 426/103; 426/110; 426/132; 426/134; 426/249
(58) Field of Search ................................ 426/90, 91, 89, 426/134, 285, 103, 110, 5, 249, 96, 132

(56) References Cited

U.S. PATENT DOCUMENTS

| | | | | |
|---|---|---|---|---|
| 1,718,997 | * | 7/1929 | Burt | 426/134 |
| 1,769,215 | * | 7/1930 | Firmin | 426/134 |
| 1,847,415 | * | 3/1932 | Snell | 426/134 |
| 1,895,697 | * | 1/1933 | York | 426/91 |
| 1,901,394 | * | 3/1933 | Hassel | 426/101 |
| 1,923,587 | * | 8/1933 | Robb | 426/91 |
| 1,939,450 | * | 12/1933 | Horton | 426/91 |
| 1,947,010 | * | 2/1934 | Jones | 426/91 |
| 2,166,568 | * | 7/1939 | Kuhlke | 426/134 |
| 2,217,700 | * | 10/1940 | Musher | 426/91 |
| 2,570,031 | * | 10/1951 | Gibson | 426/91 |
| 3,062,662 | * | 11/1962 | McDonald | 426/134 |
| 3,469,997 | * | 9/1969 | Rossi | 426/110 |
| 3,627,583 | * | 12/1971 | Troy | 426/285 |
| 4,238,510 | * | 12/1980 | Cherukuri et al. | 426/103 |
| 4,353,927 | * | 10/1982 | Lovercheck | 426/101 |
| 4,491,597 | * | 1/1985 | Varvil et al. | 426/103 |
| 5,066,502 | * | 11/1991 | Eales | 426/134 |
| 5,256,426 | * | 10/1993 | Tomioka et al. | 426/100 |
| 5,279,842 | * | 1/1994 | Gallart et al. | 426/91 |

FOREIGN PATENT DOCUMENTS

| | | | | |
|---|---|---|---|---|
| 1173691 | * | 9/1984 | (CA) | 426/112 |
| 75050 | * | 3/1983 | (EP) | 426/134 |
| 56-134965 | * | 10/1981 | (JP) . | |
| 59-028444 | * | 2/1984 | (JP) . | |
| 8-298936 | * | 11/1996 | (JP) . | |

OTHER PUBLICATIONS

Proceedings of the 47th Annual Production Conference (Dialog Abstract) Vink WV, Hershey, USA, Pennsylvania Manufacturing Confectioners Assoc., 1993.*

Candy Industry, Nov. 1982, p. 6 (Dialog Abstract).*

* cited by examiner

Primary Examiner—Steven Weinstein
(74) Attorney, Agent, or Firm—Joan H. Pauly

(57) ABSTRACT

A lollipop comprises a ball of hard candy and an edible stick having a first end extending into a cavity in the ball. The stick comprises pressed candy and a multiplicity of confectionary chips interspersed in the pressed candy. The stick is preferably received into a plastic sleeve to provide a lollipop assembly in which the stick is protected from direct contact while the candy ball is being eaten. In the manufacture of the lollipop, a plurality of book molds are positioned in a line and linked together for simultaneous opening and closing. A plurality of nozzles inject hot syrup into the molds. When the syrup has cooled and the sticks have been anchored therein, the molds are inverted and opened to allow the lollipops to drop out. The manufacture operation is automated and synchronized for maximum efficiency.

10 Claims, 4 Drawing Sheets

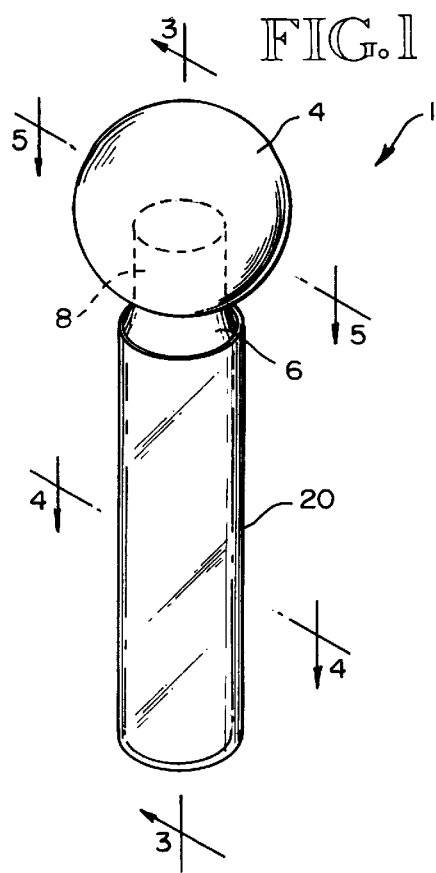
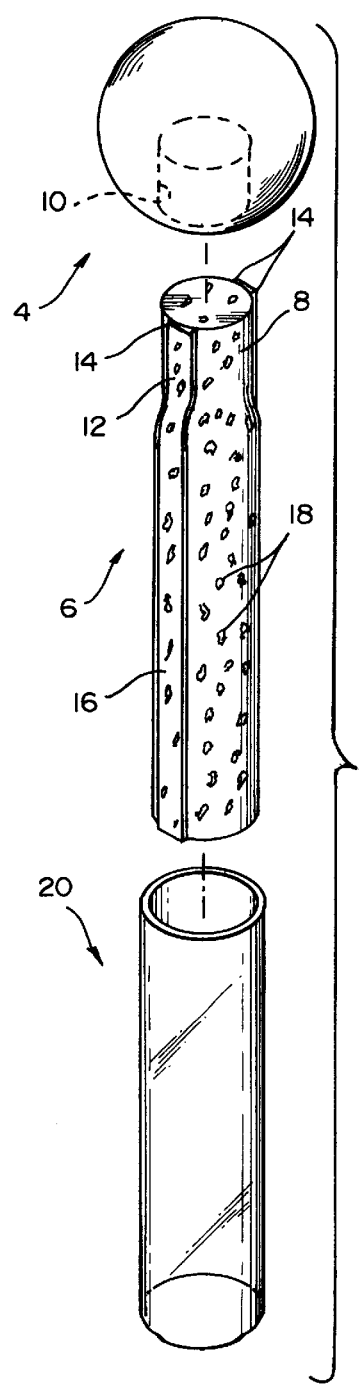
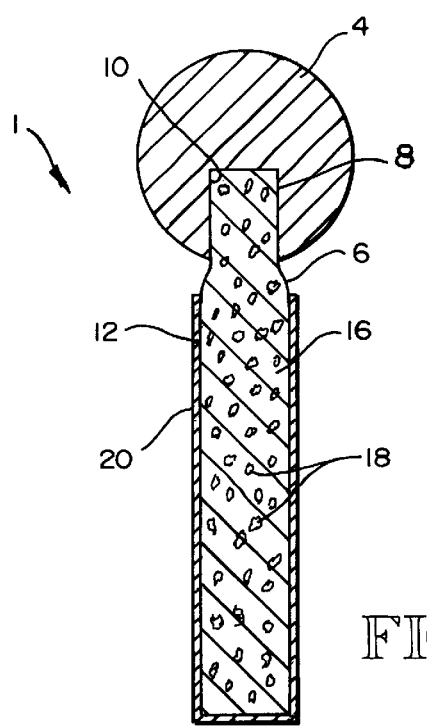
FIG. 1
FIG. 2
FIG. 3

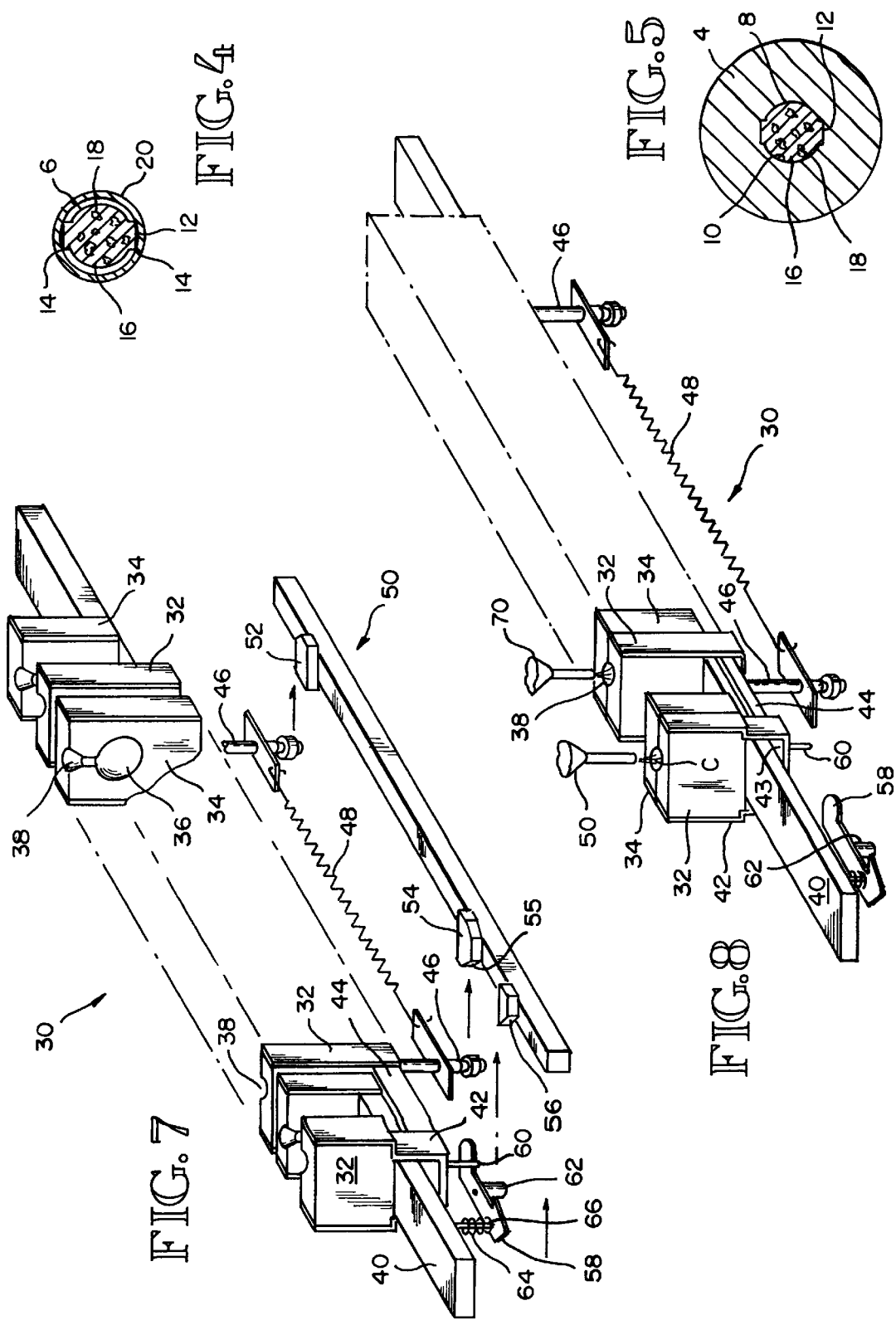

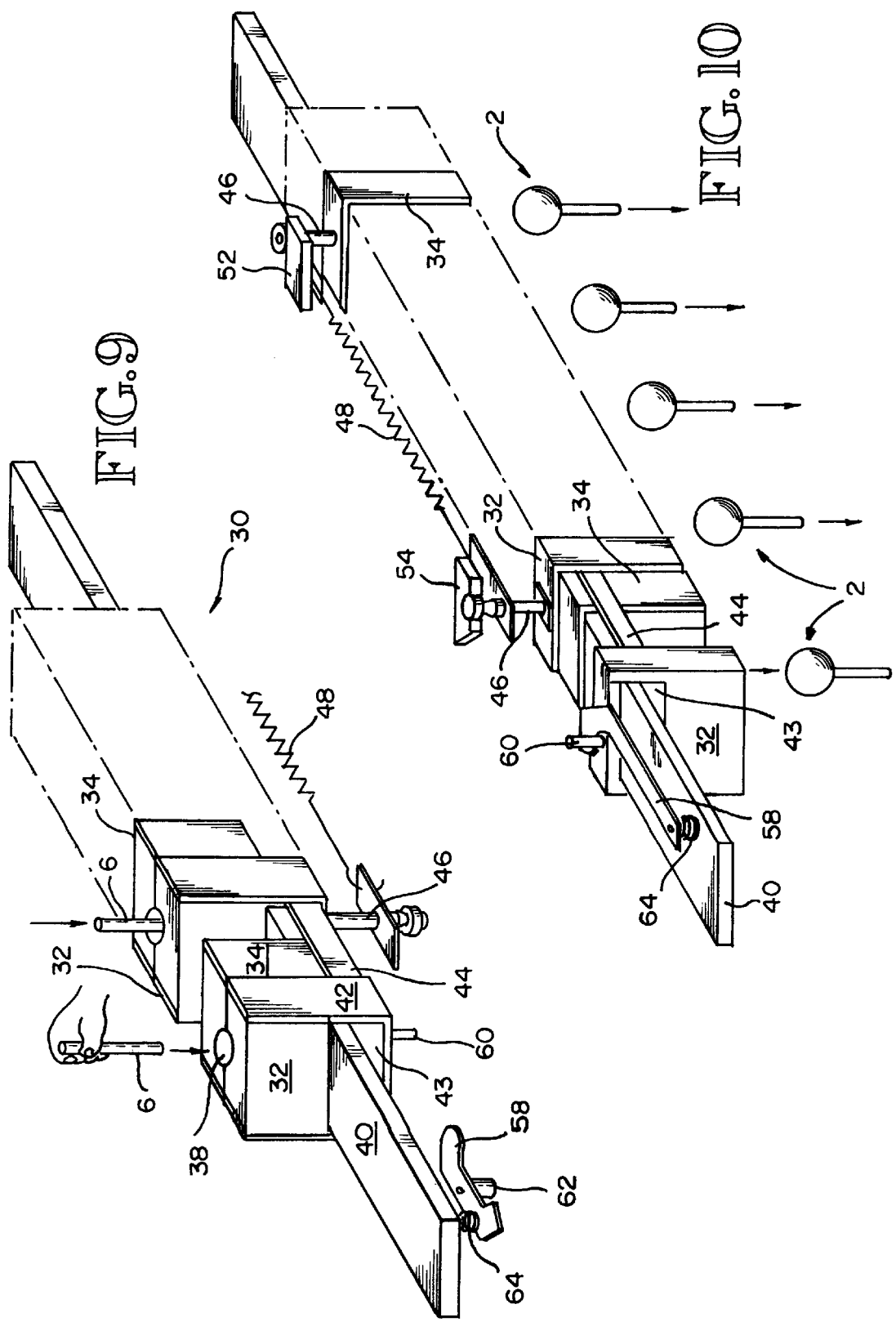

LOLLIPOP WITH EDIBLE STICK

TECHNICAL FIELD

This invention relates to lollipops and systems for making lollipops. More particularly, it relates to a lollipop having an edible stick of compressed candy with gum chips interspersed therein and to an automated system for manufacturing the lollipops. The system employs a plurality of book molds that are interconnected to open and close simultaneously and are on a conveyor synchronized with a multi-piston injector that injects hot syrup into the molds. The sticks are inserted through the injection openings into the hot syrup before it fully cools.

BACKGROUND OF THE INVENTION

Lollipops in their basic form have been well-known for at least several decades. The conventional basic form of a lollipop is a thin usually cylindrical cardboard stick that has a piece of hard candy attached to one end. In known lollipops, the candy may be substantially spherical, disk-like, or various other shapes. The candy is eaten by a person holding the stick to position the candy in the mouth for licking and/or biting. Once the candy has been consumed, the stick is discarded.

SUMMARY OF THE INVENTION

A subject of the invention is a lollipop comprising a ball of hard candy and an edible stick. The stick has a first end extending into a cavity in the ball of candy and an opposite gripping end. The stick comprises pressed candy and a multiplicity of confectionary chips interspersed in the candy. As used herein, the term "confectionary" is intended to be understood in a broad sense as including both various kinds of candy and gum, which may be bubble gum.

For delivery to a consumer, the lollipop of the invention is preferably provided in an assembly that comprises the lollipop and a plastic sleeve surrounding the stick. In its preferred form, the sleeve completely surrounds the side and outer end surfaces of the stick at least substantially to the ball of candy to provide a cover for the stick while the ball is being consumed. This helps to keep the candy stick clean for later eating while the hard candy is being consumed in the usual manner of eating a lollipop. The sleeve is preferably transparent to allow the stick and the confectionary chips therein to be visible at the time of purchase and remain visible while the hard candy is being consumed with the sleeve still protecting the stick.

A preferred feature of the invention minimizes contact between the circumferential surface of the stick and the inner surface of the sleeve. The sleeve is cylindrical. The stick is substantially cylindrical and has an outer circumferential surface with two diametrically opposite, axially extending flats formed thereon. The flats have axial edges extending radially beyond adjacent cylindrical portions of the circumferential surface of the stick. This causes the edges to contact the inner surface of the sleeve. The curved portions of the circumferential surface and the surfaces of the flats between their edges remain out of contact with the sleeve to minimize contact between the circumferential surface of the stick and the sleeve. At most, there are four axial lines of contact.

Another subject of the invention is a method of making the lollipop described above. According to an aspect of the invention, the method comprises mixing granulated candy and confectionary chips, and compressing the resulting mixture into a plurality of sticks. A plurality of book molds are linked together to open and close simultaneously. Each mold has an internal cavity and a pour opening communicating with the cavity and extending out through an outer surface of the mold. With the molds closed, hot syrup is injected from a plurality of nozzles into the cavities of the molds through the pour openings. The syrup is allowed to cool in the cavities. When the syrup has cooled but not hardened, one of the sticks is inserted through the pour opening of each mold and into the cooled syrup. The cooled syrup in each mold is allowed to completely harden into a ball of hard candy with the respective stick anchored therein. The molds are then inverted, and the molds are simultaneously opened to allow the lollipops formed by the hard candy and anchored sticks to fall out of the molds. As this procedure is carried out, the molds are supported on a conveyor, and the conveyor is synchronized with a feed speed of the hot syrup and operation of the nozzles.

Still another subject of the invention is apparatus for manufacturing lollipops. According to an aspect of the invention, the apparatus comprises a plurality of book molds arranged in a row and linked together to open and close simultaneously. Each mold has an internal cavity and a pour opening communicating with the cavity. The pour opening extends out through an outer surface of the mold. The molds are mounted for simultaneous inversion and are biased into a closed position. An actuator is engageable with the molds to simultaneously open the molds. A plurality of nozzles are positioned to simultaneously inject hot syrup into the cavities through the pour openings.

Each mold comprises first and second halves. In the preferred embodiments, the apparatus includes a link bar linking together the first halves for simultaneous movement thereof. A support bar links together the second halves and extends slidably through the first halves. A pair of spaced cam followers are carried by one of the first halves and one of the second halves, respectively. A pair of spaced abutments are carried by a cam bar and are positioned to engage the cam followers. At least one of the abutments has a cam surface to push the first halves and the second halves apart and open the molds when the cam bar and the molds are moved relatively together to bring the abutments into engagement with the cam followers.

The biasing of the molds into the closed position is preferably accomplished by a spring having opposite ends secured to the cam followers, respectively. Another preferred feature is invertibility of the support bar to invert the molds.

The method and manufacturing apparatus provide an automated and efficient system for manufacturing the lollipop. The structure of the apparatus is relatively simple and reliable in operation. In addition, the method and its apparatus are relatively inexpensive in their manufacture and maintenance.

The advantages and features discussed above and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of the preferred embodiment of the lollipop assembly of the invention.

FIG. 2 is an exploded pictorial view of the assembly shown in FIG. 1.

FIG. 3 is a sectional view taken along the line 3—3 in FIG. 1.

FIGS. 4 and 5 are cross-sectional views taken along the lines 4—4 and 5—5, respectively, in FIG. 1.

FIG. 7 is a pictorial view of a portion of the apparatus used in the manufacture, showing the book molds in an open position.

FIG. 8 is like FIG. 7 except that it shows the book molds closed and nozzles in position for injecting hot syrup into the mold cavities.

FIG. 9 is similar to FIG. 8 except that it shows the apparatus after the injection process has been completed and the hot syrup has cooled but not yet hardened. FIG. 9 illustrates the insertion of the sticks into the molds.

FIG. 10 is a pictorial view of the apparatus shown in FIGS. 7–9 in an inverted position with the molds open to allow the formed lollipops to drop out of the molds.

BEST MODE FOR CARRYING OUT THE INVENTION

Figure 6:
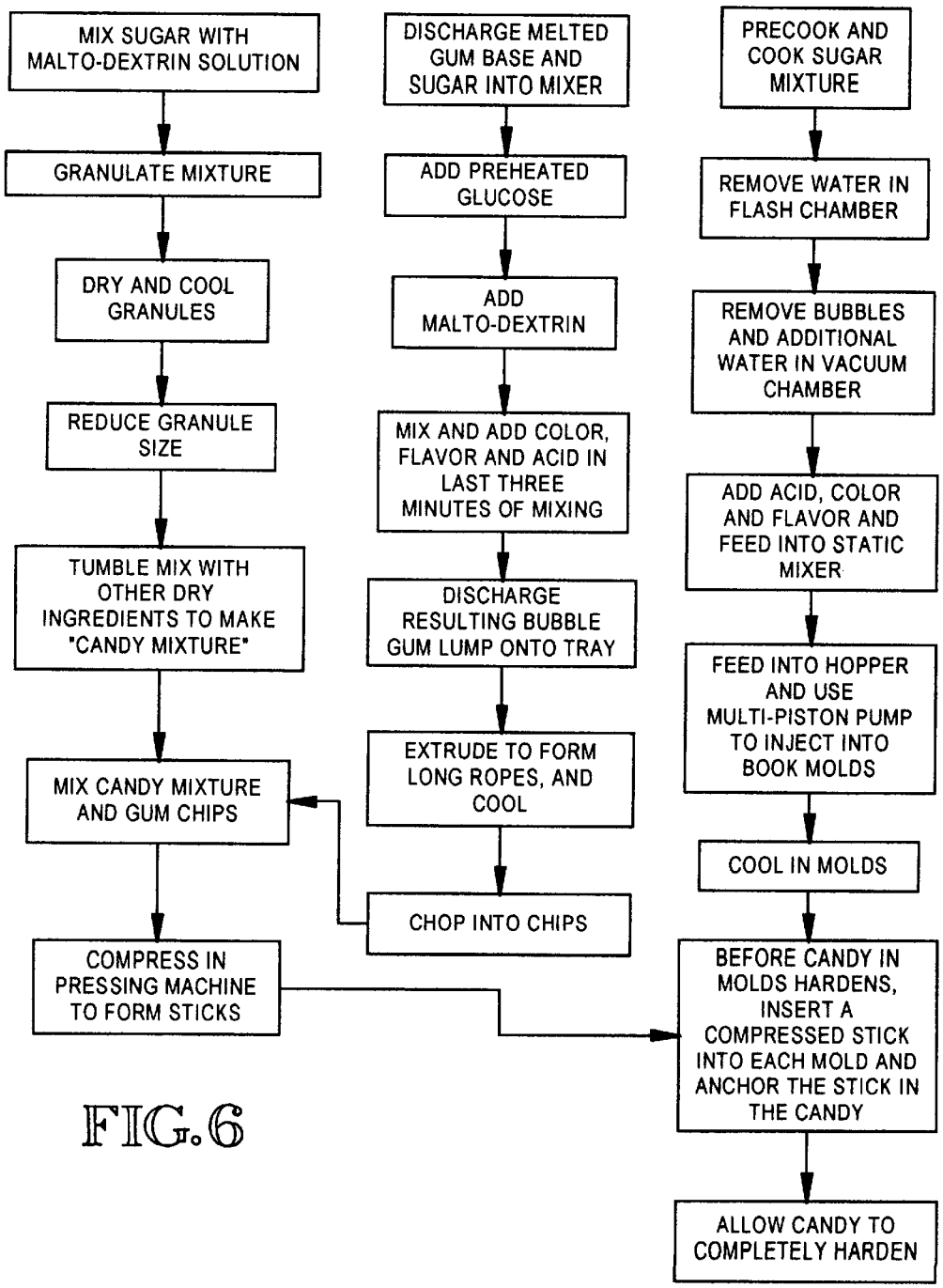
FIG. 6 is a flow chart of the method of manufacturing the lollipop shown in FIGS. 1–5.

The drawings show a lollipop assembly 1 and manufacturing apparatus that are constructed according to the invention and that constitute the best mode for carrying out the method and apparatus of the invention currently known to the applicant. The illustrated manufacturing apparatus provides automated manufacturing of the lollipop that is the most efficient manufacturing procedure currently known to the applicant. It is anticipated that the lollipop of the invention will be manufactured using the apparatus shown in the drawings and the method described herein. However, it is intended to be understood that the lollipop may also be manufactured using other manufacturing apparatus and methods and that the form of lollipops made using the illustrated apparatus may also be varied.

The preferred embodiments of the lollipop 2 and the lollipop assembly 1 are shown in FIGS. 1–5. The lollipop includes a ball of hard candy 4. As shown, the ball 4 is substantially spherical. The ball could also be various other shapes without departing from the scope of the invention. The lollipop 2 also includes a stick 6 having a first reduced diameter end 8. This end 8 is received into a cavity 10 formed in the candy ball 4, as best seen in FIG. 3. The end 8 extends into the ball 4 a distance about half the diameter of the ball 4 to provide a strong connection between the ball 4 and the stick 6. The stick 6 is substantially cylindrical and extends outwardly from the reduced diameter end 8 to an outer end. The outer circumferential surface of the stick 6 is generally cylindrical and has two diametrically opposite, axially extending flats 12 formed thereon, as shown in FIGS. 2, 4, and 5. Each flat 12 extends along the length of the stick 6 and has opposite axial edges 14. The edges 14 extend radially beyond the adjacent cylindrical portions of the circumferential surface of the stick 6.

The stick 6 is entirely edible and is made from compressed candy 16 and a multiplicity of confectionary chips 18 interspersed in the pressed candy 16. The chips may be various kinds of candy or gum. Preferably, they are small bits of bubble gum.

The end of the stick 6 opposite the reduced diameter end 8 is dimensioned for gripping to permit a child or other person to grasp the stick 6 and eat the ball of candy 4 in the usual manner of eating a lollipop. For this purpose, the opposite end is dimensioned to provide a comfortable gripping surface. For example, the portion of the stick 6 extending from the ball 4 may be about seven centimeters long and one and one quarter centimeters in diameter.

The complete lollipop assembly 1 includes a plastic sleeve 20 surrounding the stick 6. As shown in FIGS. 1–3, the sleeve 20 preferably completely surrounds the side or outer circumferential surface and the outer end surface of the stick 6. The sleeve 20 is cylindrical with a closed bottom and extends toward the ball 4 at least substantially to the ball 4 to provide a cover for the stick 6 while the ball 4 is being consumed. This cover allows the consumer to grasp the stick 6 by grasping the sleeve 20 so that the hand does not come directly into contact with the stick 6 while the stick 6 is serving as a handle to enable eating of the ball 4. In the preferred embodiment of the lollipop, the candy ball 4, pressed candy 16, and confectionary chips 18 are various colors. Preferably, the chips 18 in a single lollipop are a variety of colors. In order for the consumer to be able to enjoy these colors at the time of purchase and while the candy ball 4 is being consumed, the sleeve 20 is preferably transparent.

The cylindrical configuration of the sleeve 20 in combination with the flats 12 on the stick 6 minimizes contact between the outer circumferential surface of the stick 6 and the inner cylindrical surface of the sleeve 20. This helps prevent abrasion of the stick surface and aids in removal of the sleeve 20 when it is desired to consume the stick 6. The axial edges 14 of the stick's outer circumferential surface contact the inner surface of the sleeve 20 to provide four axial lines of contact between the stick 6 and sleeve 20, as shown in FIG. 4. The cylindrical portions of the stick's outer surface between the flats 12 and the surfaces of the flats 12 between the edges 14 of the flats 12 remain out of contact with the inner surface of the sleeve 20.

The preferred embodiment 30 of the apparatus for manufacturing the lollipop of the invention is shown in FIGS. 7–10. The apparatus 30 includes a plurality of book molds arranged in a row. Each mold has a first half 32 and a second half 34. The two halves 32, 34 cooperate to define an internal mold cavity 36. A pour opening 38 communicates with the cavity 36 and extends outwardly from the cavity 36 and out through an outer surface of the mold 32, 34. The molds 32, 34 are linked together to open and close simultaneously. They are also mounted for simultaneous inversion into an upside down position in which the pour openings 38 open onto a downwardly facing outer surface of the molds 34, 36.

Referring to FIGS. 7–10, a support bar 40 extends along the row of molds 32, 34 and is attached to each of the second halves 34 to link the second halves 34 together. Each first half is carried by and secured to a support bracket 42. Each support bracket 42 has an opening 43 extending longitudinally therethrough. The support bar 40 extends slidably through the openings 43 in the brackets 42 to slidably engage the first halves 32. A link bar 44 is attached to each of the first halves 32 to link the first halves 32 together for simultaneous movement thereof. A pair of spaced cam followers/spring posts 46 extend from one of the first halves 32 and one of the second halves 34, respectively. A spring 48 has opposite ends secured to the cam followers 46, respectively, to bias the molds 32, 34 into their closed position shown in FIGS. 8 and 9.

The apparatus includes an actuator engageable with the molds 32, 34 to simultaneously open the molds 32, 34. In its preferred embodiment, the actuator comprises a cam bar 50 that carries a pair of spaced abutments 52, 54, as shown in FIG. 7. At least one of these abutments 52, 54 has a cam surface. In the illustrated preferred embodiment, the first abutment 52 is a rectangular stop and the second abutment 54 has an angled cam surface 55. The abutments 52, 54 are positioned to engage the cam followers 46 when the molds 32, 34 and the cam bar 50 are moved relatively together. When this relative movement occurs, the stop 52 engages the cam follower 46 carried by one of the second halves 34 to prevent it from moving in a longitudinal direction along the row of molds 32, 34. The cam surface 55 on the second abutment 54 engages the cam follower 46 carried by one of the first halves 32. The angling of the cam surface 55 pushes the first half 32 that carries the cam follower 46 in a longitudinal direction away from its respective second half 34. Since the first halves 32 are linked together and the second halves 34 are linked together and the stop 52 prevents longitudinal movement of the second halves 34, the pushing engagement of the first half 32 causes each of the first halves 32 to move away from its second half 34 to open all of the molds 32, 34 simultaneously.

The cam bar 50 also carries a third abutment 56 with a configuration similar to that of the cam abutment 54. The third abutment 56 is positioned to operate a latch 58. The latch 58 is in the form of a flat hook and is secured to the support bar 40. The hooked end of the latch 58 in its latched position engages a latch pin 60 that extends downwardly (as shown in FIGS. 7–9) from the support bracket 42 that carries an endmost first half 32. A pivot post 62 extends downwardly from a mid portion of the latch 58. A spring 64 surrounds a pin 66 that connects the latch 58 to the support bar 40 to bias the latch 58 into its engaged position shown in FIG. 7. When the cam bar 50 and the molds 32, 34 are moved relatively together, the third abutment 56 engages the pivot post 62 to pivot the latch 58 to allow the latch pin 60 to pass the curved end of the latch 58 as the first halves 32 move away from the second halves 34. When the latch pin 60 has moved by the curved end, the cam surfaces of the abutment 56 allow the spring 64 to move the latch 58 into the engaged position shown in FIG. 7.

The apparatus also includes a plurality of nozzles 70 positioned in a row to be aligned with the pour openings 38 when the molds 32, 34 are in their closed position, as shown in FIG. 8. With the nozzles 70 in this position, liquid hot syrup C can be injected from the nozzles 70 through the pour openings 38 into the mold cavities 36, as illustrated in FIG. 8. This fills all the mold cavities 36 simultaneously.

The support bar 40 and link bar 44 are part of a conveyor system for moving the molds 32, 34. In the operation of the apparatus 30, in addition to the movement of the mold halves 32, 34 apart from each other, the molds 32, 34 are required to be inverted. For this purpose, the support bar 40 is invertible into the upside down position shown in FIG. 10. The inverting of the bar 4 simultaneously inverts all the molds 32, 34. The conveying system is operated to synchronize the movement of the molds 32, 34 with the feed speed of the hot syrup C as well as movement of the piston heads that are operated to eject hot syrup C through the nozzles 70. Preferably, the entire manufacturing system is computer controlled.

The method of making the lollipop of the invention is illustrated in FIGS. 6–10. FIG. 6 is a flow chart of the method, and, as described above, FIGS. 7–10 illustrate the manufacturing apparatus and the operation thereof. Referring to FIG. 6, the mixture for the pressed candy 16 and the bubble gum chips 18 of the preferred embodiment are prepared separately and then mixed together. The left hand column of blocks in FIG. 6 illustrates the preparation of the granulated mixture that becomes the pressed candy 16.

Pulverized sugar is mixed with food color and a malto-dextrin solution. The mixing is carried out for about fifteen minutes and results in a paste. The paste is discharged into a wet granulating machine to make granules of about two millimeters in diameter by eight millimeters in length. These granules are dried in a conveyor oven and then in a fluidized chamber. The dried granules are cooled, and then reduced to a size of about one millimeter cubes. The reduced size granules are tumble mixed with other dry ingredients, such as food acid, flavors, and magnesium stearate. The resulting mixture is then suitable for compressing. The bubble gum chips 18 are added to the mixture before the compressing procedure.

The making of the bubble gum chips 18 is preferably carried out simultaneously with the preparation of the granulated candy mixture. It is illustrated in the middle column of FIG. 6. The chip preparation begins with the melting of gum base in large tanks and discharging the melted gum base into a gum mixer. Pulverized sugar is also discharged into the mixer. Glucose is preheated and meter-pumped into the mixer. Malto-dextrin is then added, and the mixing process begins. In the last three minutes of mixing, color, flavor, and acid are added. The mixing results in lumps of bubble gum that are discharged onto trays. The lumps are fed into extruders where they are formed into long ropes of bubble gum, which are quickly cooled to about 6° Celsius. The hardened gum ropes are then chopped into chips of desired size. Preferably, the size of the chips varies to make their appearance in the completed lollipop more random. Also preferably, chips of various colors are prepared and mixed together to further enhance the appearance of the completed lollipop stick 6.

The granulated candy mixture and the bubble gum chips are mixed together. Then they are fed into a compressing machine in which they are formed into the candy sticks 6 for the lollipops 2. While the sticks 6 are being made, the preparation of the hard candy balls 4 is begun. This is illustrated in the right hand column in FIG. 6.

Referring to FIG. 6, crystal sugar, glucose, and water are fed into a precooking tank and heated to form a sugar mixture. As the heating occurs, the ingredients are mixed together. The sugar mixture is heated to a temperature of about 110° Celsius in about seven minutes. Then, the heated mixture is emptied into a holding tank in which it is maintained at about 110° and the precooking continues. The precooking produces a syrup that is fed from the holding tank into a cooker and is cooked to about 155° Celsius in less than about nine seconds. The super hot syrup is then released into a flash chamber where at least about 22% of its water content escapes immediately into the atmosphere. The hot syrup then flows into a vacuum chamber where bubbles inside the syrup are drawn away along with another about 0.5% of the water content. The hot syrup, still at about 150° Celsius, moves into a feeding pipe, where acid, color, and flavor are added, and then into a static mixer. The syrup with these additional ingredients mixed therein is discharged into a hopper.

The hopper has a multi-piston pump in which the pistons eject hot syrup C from a plurality of nozzles 70, as illustrated in FIG. 8. The injecting of the hot syrup C into the mold cavities 10 is described above. It is carried out with the molds 32, 34 in their upright closed position shown in FIG. 8. The hot syrup C is injected at about 140° Celsius into the cavities 36 through the pour openings 38. Following injection of the hot syrup C, the injected syrup is allowed to cool in the molds 32, 34. Before the surface of the candy mass in each mold cavity 36 hardens, one of the prepared sticks 6 is inserted into the mold 32, 34 through the pour opening 38, as illustrated in FIG. 9. This may be done by hand, as shown, or by use of an automatic magazine. The reduced diameter end 8 of the stick 6 is inserted into the pour opening 38 and into the mass of candy to a depth of about one-half the diameter of the candy mass. Following the insertion of the sticks 6, the cooled syrup in the mold cavities 36 is allowed to completely cool and harden. Complete hardening takes about twelve minutes. Once the candy ball 4 is completely hardened, the end 8 of the stick 6 is firmly anchored in the ball 4.

At this stage, the making of the lollipops 2 is complete. In order to remove the lollipops 2 from the molds 32, 34, the support bar 40 is inverted to invert the molds 32, 34 and associated apparatus, as illustrated in FIG. 10. The inverted molds 32, 34 are opened simultaneously by operation of the cam bar mechanism 50 described above. The opening of the molds 32, 34 allows the completed lollipops 2 to be discharged out of the molds 32, 34 and onto another conveyor, such as a belt conveyor. The belt conveyor conveys the lollipops 2 to another station where the plastic sleeves 20 are placed over the sticks 6 and the resulting lollipop assemblies 1 are wrapped and packaged.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. An assembly comprising:
   a lollipop including a ball of hard candy; and an edible stick having both a first end extending into said ball and anchored therein, and an opposite gripping end; said stick comprising pressed candy, and a multiplicity of confectionary chips interspersed in said pressed candy; and
   a plastic sleeve completely surrounding the side and outer end surfaces of said stick at least substantially to said ball to provide a cover for said stick while said ball is being consumed;
   in which said sleeve is cylindrical; and said stick is substantially cylindrical and has an outer circumferential surface with two diametrically opposite, axially extending flats formed thereon, said flats having axial edges extending radially beyond adjacent cylindrical portions of said circumferential surface to contact an inner surface of said sleeve and minimize contact between said circumferential surface and said sleeve.

2. The assembly of claim 1, in which said confectionary chips are gum chips.

3. The assembly of claim 1, in which said confectionary chips are bubble gum chips.

4. The assembly of claim 1, in which said sleeve is transparent.

5. The assembly of claim 4, wherein said ball, said pressed candy, and said confectionary chips are various colors, and at least some of said chips are visible on an outside circumferential surface of said stick, to enable a consumer to enjoy said various colors at a time of purchase.

6. An assembly comprising:
   a lollipop including a body of hard candy; and an edible stick having both a first end extending into said body and anchored therein, and an opposite gripping end; said stick comprising pressed candy, and a multiplicity of confectionary chips interspersed in said pressed candy; and
   a plastic sleeve completely surrounding the side and outer end surfaces of said stick at least substantially to said body to provide a cover for said stick while said body is being consumed;
   in which said sleeve is cylindrical; and said stick is substantially cylindrical and has an outer circumferential surface with two diametrically opposite, axially extending flats formed thereon, said flats having axial edges extending radially beyond adjacent cylindrical portions of said circumferential surface to contact an inner surface of said sleeve and minimize contact between said circumferential surface and said sleeve.

7. The assembly of claim 6, in which said confectionary chips are gum chips.

8. The assembly of claim 6, in which said confectionary chips are bubble gum chips.

9. The assembly of claim 6, in which said sleeve is transparent.

10. The assembly of claim 9, wherein said body, said pressed candy, and said confectionary chips are various colors, and at least some of said chips are visible on an outside circumferential surface of said stick, to enable a consumer to enjoy said various colors at a time of purchase.

* * * * *